United States Patent
Tomberlin et al.

(10) Patent No.: US 8,573,297 B2
(45) Date of Patent: Nov. 5, 2013

(54) SUBTERRANEAN FORMATION DEFORMATION MONITORING SYSTEMS

(75) Inventors: Timothy A. Tomberlin, Houston, TX (US); Bryan A. Vandal, Okotoks (CA); Grant W. Byerley, Katy, TX (US); Zachary L. A. Linkewich, Corchrane (CA)

(73) Assignees: ConocoPhillips Company, Houston, TX (US); Total E&P Canada Ltd. (CA)

( * ) Notice: Subject to any disclaimer, the term of this patent is extended or adjusted under 35 U.S.C. 154(b) by 361 days.

(21) Appl. No.: 13/038,073

(22) Filed: Mar. 1, 2011

(65) Prior Publication Data

US 2012/0138291 A1 Jun. 7, 2012

Related U.S. Application Data (60) Provisional application No. 61/312,130, filed on Mar. 9, 2010.

(51) Int. Cl.
*E21B 47/00* (2012.01)
*E21B 47/10* (2012.01)
*E21B 47/022* (2012.01)

(52) U.S. Cl.
CPC ....... *E21B 47/1015* (2013.01); *E21B 47/02216* (2013.01)
USPC ..................... 166/254.1; 166/66.5

(58) Field of Classification Search
USPC ........ 166/254.2, 250.12, 254.1, 66.5; 175/50; 102/501; 86/51
See application file for complete search history.

(56) References Cited

U.S. PATENT DOCUMENTS

| | | | |
|---|---|---|---|
| 2,592,434 A | 4/1952 | Krasnow et al. | |
| 3,461,977 A | 8/1969 | Taggart | |
| 5,720,345 A * | 2/1998 | Price et al. | 166/254.2 |
| 6,069,479 A * | 5/2000 | Taicher et al. | 324/309 |
| 6,439,125 B1 | 8/2002 | Carter | |
| 6,629,562 B1 | 10/2003 | Fidan | |
| 6,693,553 B1 * | 2/2004 | Ciglenec et al. | 340/853.1 |
| 6,766,854 B2 | 7/2004 | Ciglenec et al. | |
| 2003/0173072 A1 | 9/2003 | Vinegar et al. | |
| 2005/0194132 A1 | 9/2005 | Dudley et al. | |
| 2007/0276218 A1 | 11/2007 | Yellen | |

FOREIGN PATENT DOCUMENTS

WO WO03005063 1/2003
WO PCT/US2011/026680 3/2011

OTHER PUBLICATIONS

Wikipedia, Rare-earth Magnet (available at http://en.wikipedia.org/w/index.php?title=Rare-earth_magnet&oldid=397397257) (last visited Aug. 9, 2011).
MMPA Standards, Standard Specifications for Permanent Magnet Materials, MMPA Standards No. 0100-00, Magnet Material Producers Associations.

* cited by examiner

*Primary Examiner* — Cathleen Hutchins
(74) *Attorney, Agent, or Firm* — Boulware & Valoir (57) ABSTRACT

Method, devices and systems are provided for measuring deformation in subterranean formations. Such methods include introduction of spaced-apart depth magnetic markers along the longitudinal length of a well bore and measuring the position of each depth marker over time so as to determine deformation of the subterranean formation. In certain embodiments, depth markers comprise rare earth magnets. In further embodiments, orientation of each magnetic bullet is determined over time to determine the change in orientation of each magnetic bullet. Advantages of the methods and devices herein include, but are not limited to, improved accuracy and reliability of deformation measurements and reduced environmental impact due to the avoidance of radioactive markers used by the present invention.

19 Claims, 7 Drawing Sheets

SUBTERRANEAN FORMATION DEFORMATION MONITORING SYSTEMS

CROSS-REFERENCE TO RELATED APPLICATIONS

This application claims priority to 61/312,130, filed Mar. 9, 2010, which is incorporated in its entirety by reference.

FEDERALLY SPONSORED RESEARCH STATEMENT

Not applicable.

REFERENCE TO MICROFICHE APPENDIX

Not applicable.

FIELD OF THE INVENTION

The present invention relates generally to a method, system and devices for measuring and/or monitoring deformation in subterranean formations. More particularly, but not by way of limitation, embodiments of the present invention include methods and systems for measuring changes in spatial position and/or orientation of a plurality of depth markers over time using a logging tool.

BACKGROUND

The production of water and hydrocarbon fluids from subterranean formations reduces reservoir pressure and removes fluids from the interstitial pores of the subterranean formation. The reduction in pressure and fluid loss may cause subsidence and compaction of the subterranean formation, and the risk increases when the formation has relatively high porosity and a low compressive strength.

It is difficult to observe the compaction of a hydrocarbon reservoir, but subsidence at the surface is often easy to see. For example, water can encroach on previously dry land, an offshore platform can lose its air gap between the high waves and the bottom deck, wellheads and casing may begin to protrude from the surface, or surface structures can sink.

An excessive amount of subsidence may result in well casing failure or rig collapse, affect cap rock integrity and can permanently damage the permeability and hydrocarbon producing capability of a subterranean formation if the interstitial pores are irreparably closed. The economic consequences of compaction and subsidence can thus be huge, but not all of the consequences are negative. Compaction can also be beneficial, as it provides a potentially strong production-drive mechanism. In either case, it is desirable to monitor the subterranean formation to detect the onset of subsidence and compaction in order to effectively manage the reservoir.

In addition to subsidence and compaction, the opposite changes can also occur. Where high volumes of water, gas, and/or steam are injected into a reservoir, rock formations can dilate, thus causing surface heave. Excessive surface heave and reservoir dilation also pose a risk to surface facilities, well casing failures, and cap rock integrity. Simulation studies also suggest that reservoir dilation can increase reservoir porosity and permeability. Unfortunately, however, there are no existing technologies to date that can measure this effect in the reservoir.

Deformation monitoring methods differ for onshore and offshore areas. Onshore, benchmarks are common tools of civil engineers. A benchmark is a survey mark at a known position and a measured elevation that is used to determine changes in elevation with respect to other benchmarks. Benchmarks outside of the subsidence bowl provide fixed reference points.

The most accurate way to determine an elevation difference between benchmarks is to connect two locations with a liquid-filled tube. The hydrostatic level will be the same at both ends of the tube, so changes in relative elevation can be determined with great accuracy. However, performing this type of survey over large areas can be prohibitively expensive.

Tiltmeters—devices that are sensitive to the change of angle on the surface or in wells—can provide subsidence data for onshore locations. These devices are also used to monitor the advance of an induced fracture.

Global positioning system (GPS) stations can be used for fixed positions either onshore or offshore. Under ideal conditions, GPS techniques can detect elevation changes of about 2 mm.

Another method that is under evaluation by several companies uses satellites for subsidence monitoring. Interferometric synthetic aperture radar (InSAR) relies on repeated imaging of a given geographic location by air- or space-borne radar platforms. The InSAR method has limitations, though, because growth of vegetation between satellite passes can cause interpretation problems over open fields. Also, rapid changes in elevation, such as occur near active faults, are easier to measure than slow subsidence. Finally, distance measurements can be made when the satellite is ascending or when it is descending. Since the angle of reflection is different, the two measures generally involve different sets of scatterers, and the ascending and descending measurements of subsidence may not agree completely.

Offshore, the subsidence bowl is not easily accessed. Most commonly, subsidence is monitored at platforms. This is not merely a convenience, but a necessity. The air gap, or distance between mean sea level and the lowest structure of the platform, has to remain greater than the wave height. Companies use a statistically derived wave height, often the maximum wave height expected over a 100-year period.

The air gap can be measured by several methods, all of which rely on a known benchmark on the platform. Continuous measurement of distance to the water can be obtained acoustically; alternatively, an underwater pressure transducer mounted on the leg of the platform can indicate the height of the water column above it. Interpretation of these two methods requires knowledge of sea level at the time of the measurement, which means tides and wind-driven waves have to be considered.

Today, the most common method for determining platform subsidence is by using GPS, as is done onshore. Some interpretation methods require a nearby platform that is not subsiding, but the methodology is improving, and some companies that provide this service to the industry now claim their interpretation does not require a near, fixed benchmark.

Subsidence also affects pipelines and other structures on the seabed. Bathymetry surveys are the most direct way to map the extent of an undersea subsidence bowl. The survey indicates water depth with respect to sea level. This is generally obtained by bouncing an acoustic signal off the mudline and back to a receiver. The traveltime measurement must be corrected for the effects of water salinity and temperature, and variation therein can affect accuracy.

Heave is usually more difficult to measure than subsidence. In the past, time-lapse logging for casing collar location and for petrophysical markers, time-lapse seismic studies, and microseismic arrays were used. But these methods have largely been dis-continued as insufficiently accurate.

The radioactive marker technique (RMT) for in situ compaction measurements in deep producing gas/oil reservoirs was originally developed almost 40 years ago (De Loos, 1973, *In-situ compaction measurements in Groningen observation wells, Verhandenlingen Kon. Ned. Geol. Mijnbouwk. Gen.*, 28, 79-104) and since then has continuously improved to become the most commonly used method for monitoring subsidence (Mobach and Gussinklo, 1994, *In-situ reservoir compaction monitoring in the Groningen field. Proceedings of EUROCK 94, Rock Mechanics for Petroleum Engineering*, The Netherlands, 535-547. A.A. Balkema Publ).

RMT provides a realistic estimate of the uniaxial vertical compressibility $C_M$ of producing gas/oil reservoirs. The RMT technique is based on repeated measurements of the vertical distance between weakly radioactive isotopes located into bullet-shaped steel containers (called markers) and shot about 10.5 m apart within the producing formation through the wall of a vertical, generally unproductive, well prior to the casing operations. The best place to put the markers is in a vertical monitor well because deviated wells introduce an error in the position of the marker, depending on the orientation of the gun when the bullets are fired. It is also best to avoid producing wells, since producing wells may also flow formation solids, introducing uncertainty about the cause of the marker movement—either compaction or solids production.

Once the markers are in place, their position can be determined over time to monitor deformations. Generally, an invar rod carrying two pairs of gamma-ray detectors within or thereon is slowly raised at a constant speed from the borehole bottom and records the count rate peaks when the detectors are facing the markers. The mean spacing between the top and bottom detectors is roughly the same as the spacing between the markers, which minimizes distance errors due to any tool movement from the wireline cable stretching and contracting. The recording procedure is typically repeated three to five times to minimize instrument and operational errors. Finally the measurements are processed to obtain an average estimate of the shortening $\Delta h_i$ of the i-th monitored interval.

If $\Delta p_i$ is the average pore pressure drawdown experienced by the formation where the i-th marker pair is located, the in situ uniaxial rock compressibility can be estimated as:

$$c_{M,i} = \frac{\Delta h_i}{h_i \Delta p_i}$$

with $h_i$ the initial marker spacing approximately equal to 10.5 m.

The field $C_M$ can also be evaluated by the simple equation:

$$c_M = \frac{\overline{\Delta h}}{h_0 \Delta p}$$

where $\overline{\Delta h} = \overline{h_t} - \overline{h_0}$ is the average vertical deformation (expansion if positive, compaction if negative) of the marker interval; $\overline{h_0}$ and $\overline{h_t}$ is the average distance between two adjacent markers at the initial time and at time t, respectively; and $\Delta p$ is the fluid pressure variation (rise if positive, drawdown if negative) that occurred within the monitored depth interval over the time period 0-t.

Additional details on these and various other stress and deformation calculations is readily available (e.g., M Ferronato, et al., *Unloading-Reloading Uniaxial Compressibility Of Deep Reservoirs By Marker Measurements, Proceedings, 11th FIG Symposium on Deformation Measurements*, Santorini, Greece, 2003, M Ferronato, et al., *Radioactive Marker Measurements in Heterogeneous Reservoirs: Numerical Study, International Journal Of Geomechanics*, 79-92 (2004) (incorporated by reference) and similar literature).

Unfortunately, although a very useful technique, the use of the radioactive markers poses an environmental exposure hazard under some circumstances. For example, when a subterranean formation comprises high density rock, the bullets may bounce and can become lost or partially lodged in the wall of the borehole. Other stray radioactive marker bullets may simply fall to the bottom of the borehole. These stray radioactive marker bullets are typically left in the borehole and cemented in. When the next section of the borehole is drilled, some of the stray radioactive marker bullets may be crushed, exposing the drilling mud to radioactive particles, risking human exposure or exposure to the external environment and/or aquifers. Accordingly, it would be desirable to use depth markers that do not pose such hazards to the environment, personnel or nearby residents.

Additionally, the RMT of the prior art only provide rough information about changes in the depth of the radioactive marker. Information about orientation and horizontal shift is not available. Thus, the information provided is incomplete.

Accordingly, there is a need in the art for improved methods, devices and system for monitoring subsurface formation deformation that address one or more disadvantages of the prior art.

SUMMARY OF THE INVENTION

The present invention relates generally to a method, devices and systems for measuring and/or monitoring deformation of subterranean formations or ascertaining an exact location underground. More particularly, embodiments of the present invention include methods, devices and systems for measuring changes in spatial position and/or orientation of a plurality of magnetic depth markers over time using a logging tool having a plurality of magnetic sensors.

One embodiment is a method for measuring deformation in a subterranean formation comprising the steps of introducing a plurality of magnetic markers into a well hole of a subterranean formation at different depths, such that each of the plurality of magnetic markers are about equally spaced-apart from one another in depth. A logging tool is introduced into said well hole, wherein the logging tool comprises an elongated body and at least two magnetic sensors therein. Preferably, those sensors are spaced apart at about the same spacing at the magnetic bullets, which improves the accuracy of measurements. A first spatial position of each magnetic marker is determined and recorded, and then compared with subsequent positions over time. Such measurements repeated over time can be used to calculate the amount of deformation of the formation, since any deformation will cause the markers to move up or down and/or change orientation or move sideways.

The logging tool itself is another embodiment of the invention. In preferred embodiment, the logging tool can also determine inclination and declination of the plurality of magnetic bullets, thus providing information of lateral movements as well as vertical movements in the geology. Particularly preferred magnetic sensors comprising three orthogonal vector magnetometers, but the sensors can be a scalar magnetometer or other magnetometer or combinations thereof.

If the method is used only to mark a particular underground location, a single magnetic marker may suffice, and the logging tool need only comprise a single sensor. However, a logging tool with a plurality of sensors will be useful for both methods, and thus may be preferred.

Another embodiment comprises a magnetic marker having a magnetic core and an outer casing. Preferably, the magnetic bullet has an exterior aerodynamic casing surrounding the magnetic core, said casing being cylindrical or conical and having a point and a base. The casing can also include fins and other protrusions. Generally the bullet is twice as long as wide, but can be 4 or more times as long. Also, in the ideal case, the casing around the magnetic core will be comprised of non-magnetic steel.

Another embodiment comprises means for calculating earth deformation based on measurements provided by said logging tool of the positions and optionally orientation of said magnetic bullets when placed in a subterranean formation at different depths therein, said different depths separated by about said first distance. Such means includes software for calculating inclination, declination and other movements and can further comprise modeling deformations based on changes in same, together with the circuitry needed to run such software.

The components described above, can be used independently, or can be assembled into a complete system for measuring deformation. In such case, the system can further comprise a perforation or ballistics gun for inserting said plurality of magnetic bullets into a subterranean formation. Depending on the success of a delivery system focused on ballistics, other systems may be utilized such as a sidewall drilling tool and mill system, which can place the magnet at a precise predetermined distance from the wellbore.

In one embodiment of the method, a plurality of magnetic markers are placed in a subterranean formation at different positions, wherein the different positions have about equal spacings. By "about equal spacings" or "about same spacings" or similar phrases used herein, what is meant is roughly the same spacings, plus or minus 20%, but preferably plus or minus 10%.

The magnetic marker can be any suitable magnetic material having sufficient strength to be detected at its distance from the logging tool and can be surrounded by a protective casing. Magnetic cores can be selected from the group consisting of a rare earth magnet, a neodymium magnet, a samarium-cobalt magnet, a $Sm(Co,Fe,Cu,Zr)_7$ magnet, a $YCO_5$ magnet, a battery powered magnet, an RF powered magnet, an alnico magnet, a bonded magnet, a ceramic (ferrite) magnet, and a flexible rubber magnet, and the like.

Preferably, the magnetic core is a permanent magnet and has a field strength of about 1, 1.2, 1.4, 1.6. 1.8 or 2 Tesla. However, the strength is inversely proportional to the cube of distance over which the magnetic field is measured, and thus magnetic strength should be increased if the markers are to be placed farther away from the logging tool, and decreased if closer.

Preferably, a rare earth magnet is employed. Examples of rare earth magnets suitable for use with the present invention include, but are not limited to, neodymium rare earth magnets, samarium-cobalt rare earth magnets, $Nd_2Fe_{14}B$, $SmCo_5$, $Sm(Co,Fe,Cu,Zr)_7$, $YCO_5$, or any combination thereof. Neodymium magnets are the strongest and most affordable type of rare-earth magnet, and are generally preferred, but samarium-cobalt magnets have a higher Curie temperature (the temperature at which the material loses its magnetism) and are preferred for very high operating temperatures.

Particular types of rare earth magnets may also be selected as desired according to the conditions to which the rare earth magnets may be exposed. For example, any of the following factors may be considered in selecting a type of rare earth magnet: remanence (Br) (which measures the strength of the magnetic field), coercivity (Hci) (the material's resistance to becoming demagnetized), energy product ($BH_{max}$) (the density of magnetic energy), and the Curie temperature (Tc). Generally, rare earth magnets have higher remanence, much higher coercivity and energy product than other types of magnets. Where high magnetic anisotropy is desired, $YCO_5$ may be suitable for use in the magnetic bullets.

In place of or in addition to the rare earth magnets, powered magnets may be incorporated into one or more of the magnetic bullets. Batteries may be used to power the powered magnets as desired. Alternatively, RF or other electromagnetic radiation activated power sources can be used to power the magnet, such as is used with RFID tags.

Preferably the markers are deployed using the existing perforation guns and the markers are shaped to fit therein. Thus, the casings are generally cylindrical or conical having a point and a base—in other words generally bullet shaped. In this instance the casing should be sufficiently rigid as to allow use of the gun, without crushing the casing or core, and metals, such as steel or ceramics can be used. In some applications the casing can be polymer or rubber based, e.g., where the subsurface is softer, and in such instances, the casing and magnetic core can be integral, e.g., wherein the magnets are manufactured by mixing ferrite or neodymium magnet powders admixed with synthetic or natural rubber binders.

The calculations for estimating deformation, stress, vertical compressibility and the like, can proceed as is currently employed for RTM measurements or as might be employed in the future as increasingly accurate models are developed. The main difference between the technique of the invention and the prior art radioactive marker technique is that magnetic sensors, rather than gamma ray detectors, are used in ascertaining marker position. Additionally, the calculations for incorporating hitherto unavailable inclination and declination data, which becomes available on the use of vector magnetometers, can be derived from paleomagnetic literature, where endogenous magnetic ores and the earth's natural magnetic field have long been used to study movement of the earths crust.

Means for performing such calculations are also provided, and can be integral to the down hole tool or separate therefrom. Communications means, display means and the like can also be combined with the calculating means, but on board or remote computers, dedicated chips or circuitry, wireless communicators, monitors or display screens, and the like are well known and are not detailed herein.

The down hole or logging tool for making the measurements has at least two magnetic sensors, and preferably four, wherein each pair of sensors has roughly the same spacing as the magnetic markers.

Preferably the magnetic sensors are magnetometers, such as are typically employed in ground-based electromagnetic geophysical surveys. Either scalar or vector magnetometers, or combinations thereof can be used. Scalar magnetometers measure the total strength of the magnetic field to which they are subjected, and vector magnetometers have the capability to measure the component of the magnetic field in a particular direction. For example, the use of three orthogonal vector magnetometers allows the magnetic field strength, inclination and declination to be uniquely defined. This is particularly useful in the methods of the invention because such a device will allow for an indication of both horizontal and vertical movements and thus provide much greater deformation detail that the currently used RTM method.

Examples of magnetometers are the rotating coil magnetometer (obsolete), Hall effect magnetometer, proton precession magnetometer, gradiometer, fluxgate magnetometer, uniaxial fluxgate magnetometer, paired fluxgate magnetometers, Bell-Bloom magnetometer, caesium magnetometer, Spin-exchange relaxation-free (SERF) atomic magnetometers, and SQUID magnetometer.

BRIEF DESCRIPTION OF THE DRAWINGS

A more complete understanding of the present disclosure and advantages thereof may be acquired by referring to the following description taken in conjunction with the accompanying figures, wherein.

DETAILED DESCRIPTION

The present invention relates generally to a method, devices and a system for measuring and monitoring subterranean formation deformation. More particularly, but not by way of limitation, embodiments of the present invention include methods, devices and systems for measuring changes in vertical position and/or orientation and/or horizontal position of a plurality of depth markers over time using a logging tool.

Methods, devices and systems are provided for subsurface deformation monitoring using magnetic depth markers. In certain embodiments, the depth markers comprise magnetic bullets. The magnetic bullets can be used in the deformation measurement methods described herein, or can be used in any other subsurface applications where positional markers are needed.

Advantages of certain embodiments disclosed herein include more accurate and reliable spatial position measurements of the depth markers. Additionally, certain embodiments allow for determination of the both the position and the orientation of each depth marker, which yields information about both vertical and horizontal subsurface deformation and thus is a significant improvement over the prior art which generally does not provide horizontal information. Furthermore, the use of magnetic bullets is more environmentally friendly than conventional subsurface deformation monitoring systems that use radioactive depth markers, and in some circumstances are less costly than certain conventional methods.

Accurate determination of subsurface deformation is advantageous in that it provides valuable information that may be used to evaluate or predict formation subsidence or compaction or formation dilation or heave. Evaluation and prediction of these conditions is important to evaluate risks to operating facilities over actively producing wells, casing strains for predicting casing failures, for evaluation of impacts upon formation properties such as formation porosity and permeability, and are a necessary precursor for implementing preventative and other management measures.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

Figure 1:
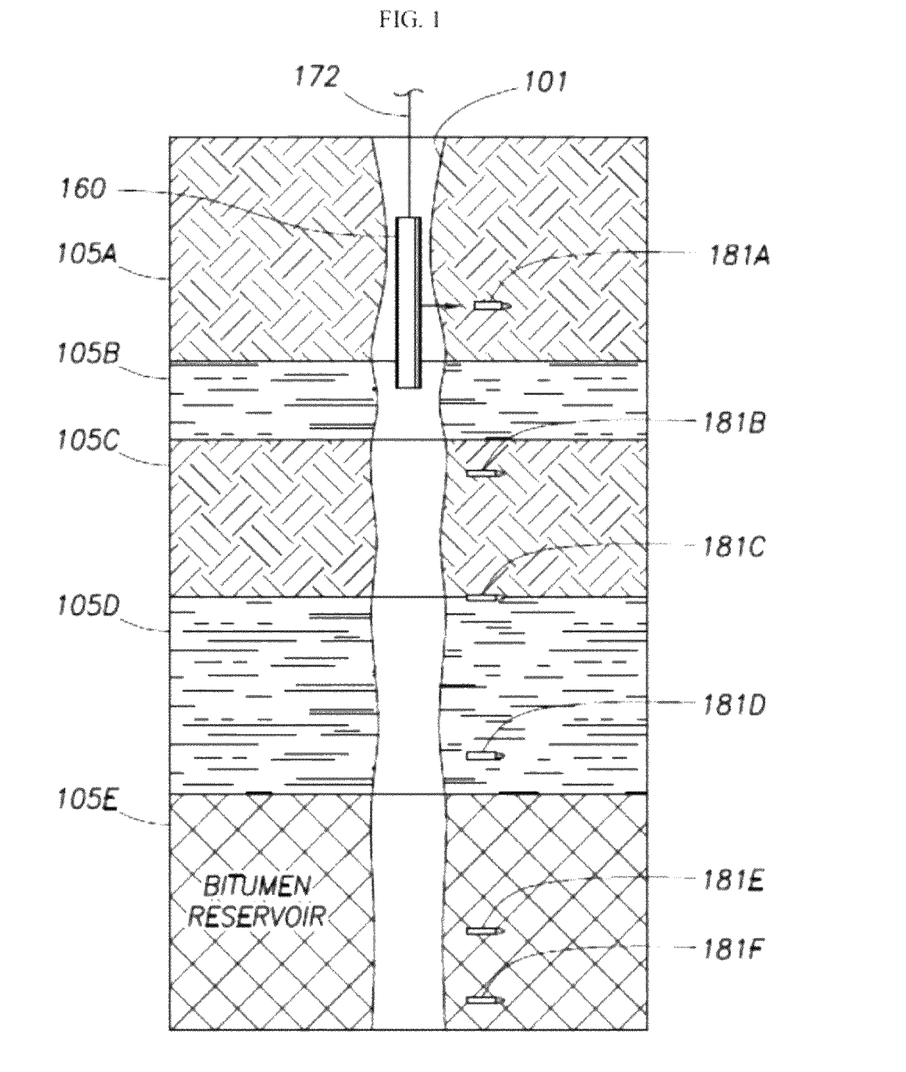
FIG. 1 illustrates a bullet insertion gun in a well bore for introducing depth markers at multiple depths into a subterranean formation.

FIG. 1 illustrates a bullet insertion gun in a well bore for introducing depth markers at multiple depths into a subterranean formation. Bullet insertion gun 160 is shown being extended into well bore 101 via wireline 172. Bullet insertion gun 160 may be any device suitable for introducing depth markers 181A-181F into subterranean formation 105. Examples of suitable bullet insertion guns 160 include, but are not limited to, perforation guns, modified perforation guns, other devices known in the art for introducing depth markers into a formation.

In FIG. 1, depth markers 181A-F are shown distributed throughout formation 105, which is comprised of strata 105A-E. Bullet insertion gun may be lowered to any desired depth and activated so as to radially introduce one or more (one shown) depth markers 181 into formation 105 at discrete depth intervals.

In certain embodiments, depth markers 181 may comprise magnetic bullets. The use of a magnetic field to signal the presence of a depth marker rather than a radioactive isotope is environmentally advantageous, as no known adverse health or environmental risks are known to exist as a result of introducing magnetic fields in subterranean formations. Indeed, the earth already provides a background magnetic field, which can be subtracted out of the measurements.

Figure 2:
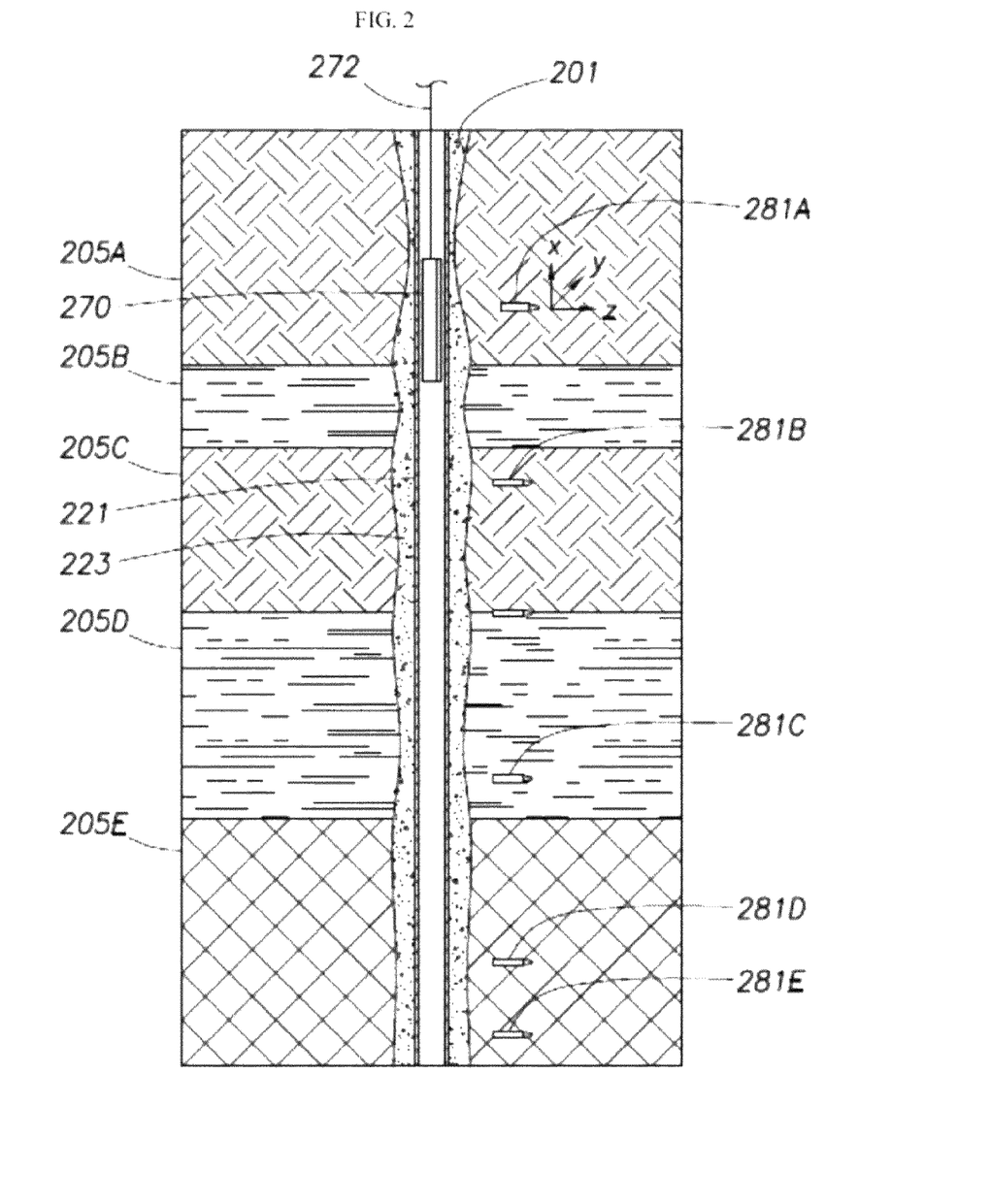
FIG. 2 illustrates a logging tool in a well bore for determining the spatial position and/or orientation of depth markers in a subterranean formation.

FIG. 2 illustrates a logging tool in a well bore for determining the spatial position and/or orientation of depth markers in a subterranean formation. After introduction of depth markers 281A-F into formation 205, well bore 201 may be completed by introducing one or more casings 221 into well bore 201 and cementing 223 casing(s) 221 in place. The magnetic fields can still be measured once the casings are in place, although it may be necessary to degauss iron-based casings on some occasions.

Logging tool 270 comprises at least two magnetic sensors for detecting the presence, spatial position, and/or orientation of depth markers 281 in formation 205. The sensors can be placed inside a housing or placed on the surface of the tool, as desired, provided the sensors are protected from the exterior environment and are capable of sufficient sensitivity through any housing material.

As logging tool 270 is extended into well bore 201 via wireline 272, the sensors (not shown) in logging tool 270 determine the presence, spatial position, and/or orientation of each depth marker 281 that are distributed throughout the strata 281A-E. Usually, such measurements are taken as the tool travels the length of the well hole, or some portion thereof. Any number of depth markers may be introduced and distributed throughout formation 205 as desired.

Typically, a baseline measurement will be established upon the introduction of depth markers 281 into formation 205 to ascertain initial spatial positions and/or orientations of depth markers 281. One can optionally also include a pre-marker run in order to ascertain and thus subtract out the endogenous magnetic fields, and this may be important in certain formations with active and/or variable natural magnetic fields.

After an elapse of time, additional measurements are conducted to establish subsequent spatial positions and/or subsequent orientations of depth markers 281. Subsequent measurements may be conducted as many times as desired. Each subsequent measurement may be compared to any previous measurement to determine the degree and nature of any subsurface deformation that may have occurred during the intervening time period. Accordingly, in this way, time lapse logging of the spatial positions and/or orientation of the depth markers will indicate the degree and speed of any subsurface deformation.

To further increase the accuracy of the methods herein, casing 221 may be degaussed to reduce the impact of any hotspots or magnetically-charged portions of casing 221 where desired.

Figure 3:
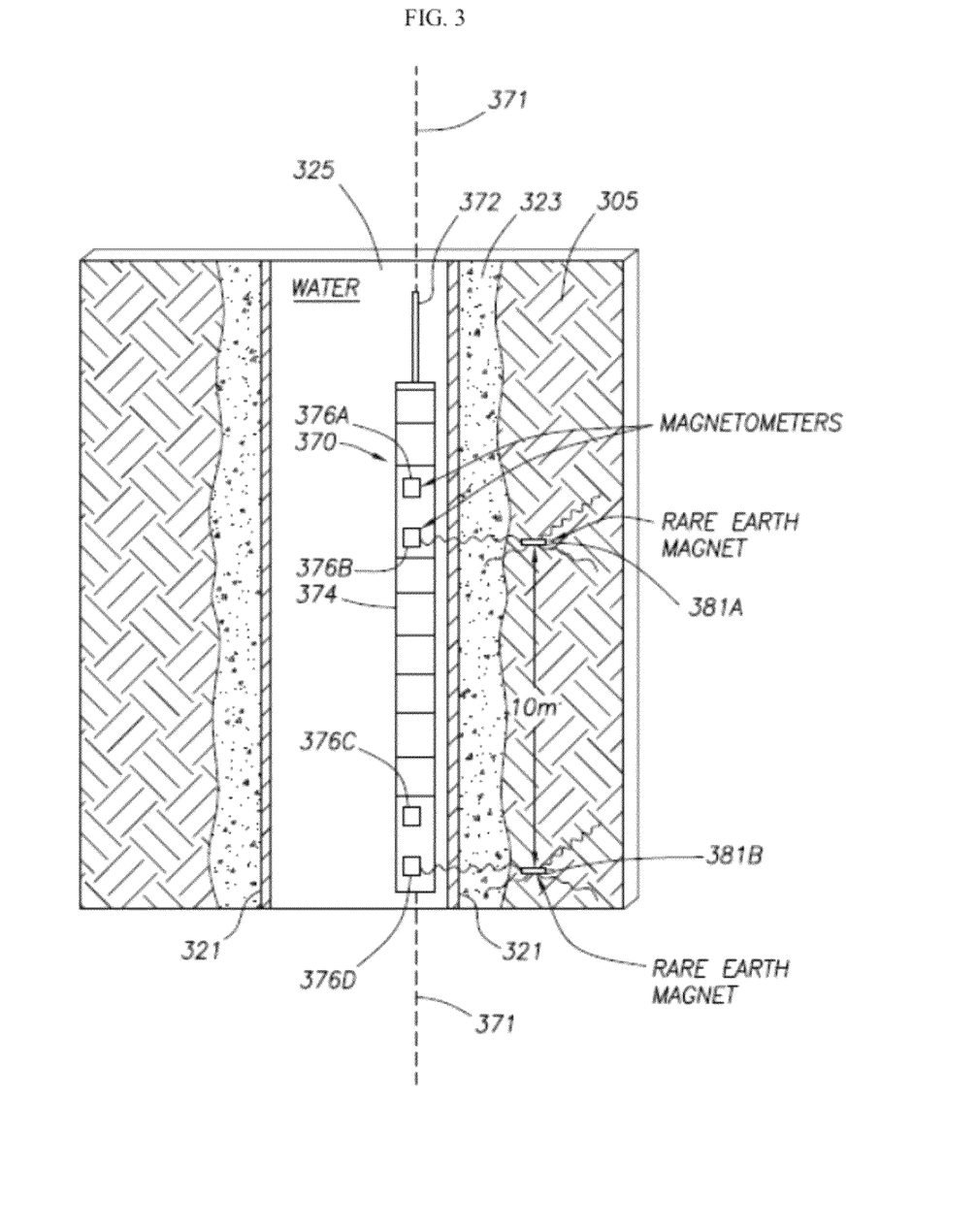
FIG. 3 illustrates a logging tool in a well bore in accordance with one embodiment of the present invention.

FIG. 3 illustrates a logging tool in a well bore in accordance with one embodiment of the present invention. Well bore 301 is an observation well filled with fluid 325, in this case water. Well bore 301 has been completed with casing 321, which has been cemented in place with cement 323.

Logging tool 370 may be introduced into well bore 301 via wireline 372. Logging tool 370 comprises body 374 and one or more sensors 376, in this case, sensors 376A, 376B, 376C, and 376D. Logging tool 370 has longitudinal axis 371 passing therethrough such that longitudinal axis 371 is coaxial to wireline 371. In certain embodiments, magnetic sensors 376 may be spaced-apart and distributed along the length of longitudinal axis 371 at a spacing roughly equivalent to the spacing of the magnetic markers thus reducing error. Nevertheless, magnetic sensors 371 may be placed in an array in any configuration as desired throughout or on logging tool 370.

Magnetic sensors 376 are any instrument suitable for determining the presence, spatial position, and/or orientation of depth markers 381, such as magnetometers. Magnetometers may include vector magnetometers, particularly where orientation information regarding depth markers is desired.

Longitudinal depths of the depth markers may be estimated through determination of which depths correspond to the maximum field strength sensed by one or more sensors 376. Additionally, where more than one sensor 376 is used or where a vector magnetometer is used, triangulation or other vector determinations may be used to ascertain the spatial position of each depth marker. Using the methods and systems disclosed herein, accurate depth measurements may be ascertained to about ±25 mm, preferably 10 mm, and in some embodiments, accuracies of up to about ±1-2 mm.

Measuring the radial displacement and changes in orientation over time of each depth marker provides additional information about the nature of the subsurface formation deformation that is useful for analysis of the potential impact of the deformations over time. In this way, the method provides a way to monitor both vertical and horizontal movements in a very sensitive fashion.

Radial distances of depth markers 381 into formation 305 may be determined in a variety of ways. In certain embodiments, the strength of the maximum magnetic field strength may be correlated to models of diminution of field strength versus distance from the sensor. Where the composition of the formation is known, fairly accurate radial determinations may be estimated using field diminution estimation models.

Depth markers 381 may comprise any material capable of generating a magnetic field that can be sensed by magnetic sensors 376. In certain embodiments, depth markers 381 comprise one or more magnets. The magnets should be sufficiently powerful to generate a magnetic field capable of being sensed by logging tool 370 through the formation and any intervening cement and/or casing and any housing protecting the sensors. Accordingly, examples of suitable magnets include, but are not limited to magnets with a field strength of at least about 0.5 Tesla and in other embodiments, at least about 1.4 Tesla or higher.

A variety of magnetic markers are illustrated in FIG. 4A-E. For example a simple magnetic marker is shown in 4A, wherein the marker 1 is roughly cylindrical and has a point 2 and a base 3. In certain embodiments, the magnetic marker may comprise an outer shell 5 or casing so as to protect the inner magnetic core 4 of the bullet during the insertion of the bullet into the formation by a perforation gun. This is shown in cross section in 4B and perspective with the base cut away in 4C. In such instances, the marker can also be called a magnetic bullet. The shells of the magnetic bullet may be comprised of steel, any alloy sufficient to withstand the conditions to which the bullet may be exposed, any ceramic, polymer, or any combination thereof, depending on the conditions of use (e.g, the forces applied by the gun and the softness or hardness of the formation).

Figures 4, 4A:
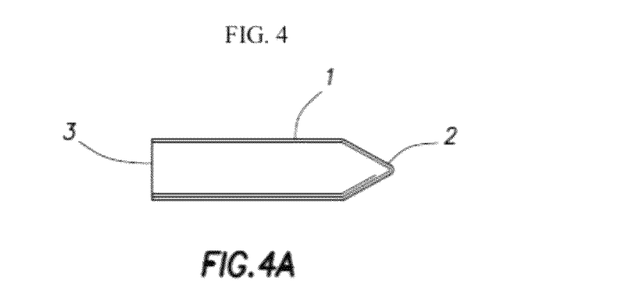
FIG. 4A-D shows a magnetic bullet (4A) with core and bullet casing (4B, 4C), and optional fins or barbs (4D) to prevent reverse motion.
Figure 4B:
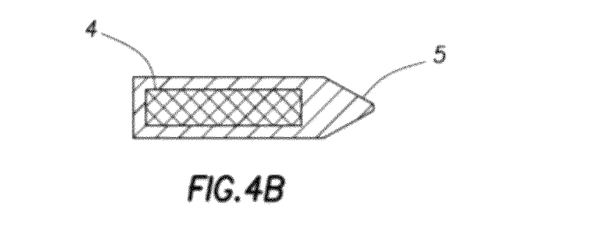
Figure 4C:
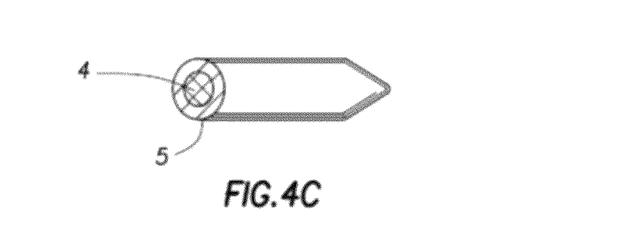
Figure 4D:
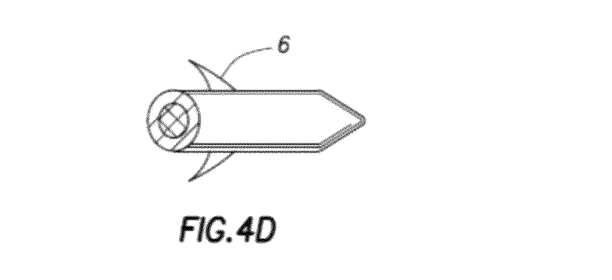

Magnetic bullets may further comprise other features such as fins 6 (e.g. to aid in trajectory guidance into the formation), as shown in 4D. Magnetic bullets may also utilize a type of barb, teeth, and/or other protruding fixing mechanism (e.g., 6) on the exterior thereof to ensure the magnetic bullets remain coupled to the rock formation so as to prevent retreat of the magnetic bullets toward the well, since the magnetic bullets will be attracted to the steel casing. Such barbs can be fixed or are preferably compressible (e.g., spring biased), so as to minimize the fin profile during ejection of the bullet and penetration of the surrounding formation. The fin and the barb functions can be served by the same protrusions.

In certain embodiments, an elongated magnetic bullet may be preferred for greater ease of ascertaining inclination or declination. In such embodiments, magnetic bullets of the present invention may have a longitudinal length that is at least about 4 times greater than its corresponding lateral width. In other embodiments, the bullet can be much shorter and 2-3 times as long as wide.

In certain embodiments, depth markers may be placed at distances from about 0.1 meters to about 1 meter from the well bore into the formation. Although depth markers may be spaced-apart at any distance from adjacent depth markers as desired, certain embodiments include spacing the depth markers from about 5 meters to about 20 meters from one another. In still other embodiments, depth markers are spaced-apart from one another at distances from about 9 meters to about 12 meters from one another. Preferably, the markers are about 10 meters apart.

EXAMPLE 1

Field Test

A field test was performed to determine if magnetic markers can be placed in the formation using a modified, side wall percussion core gun, the explosive powder gram charge best suited for the different formations, the associated marker capsule penetration depths and detection capabilities of both the ORIT and the CBIL logs. The logs were used to both verify the signal after the magnets were placed and also to understand the penetration depth and damaged zone around the target.

Figure 5:
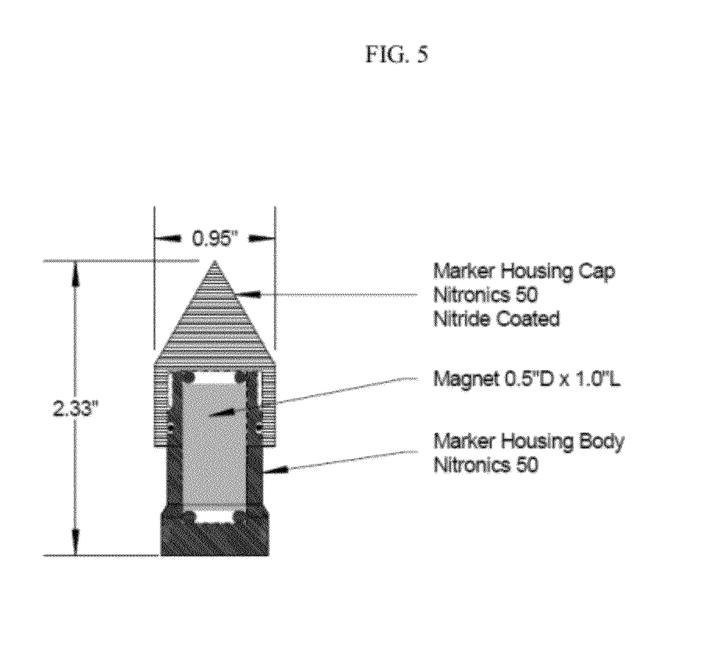
FIG. 5 shows the details of test bullets used in an actual field trial.

The gun normally shoots an open topped, tethered cylinder into a formation in order to sample the formation, and then the core sample is retrieved. Here, the cylinder was replaced with an untethered magnetic bullet, as shown in FIG. 5. Various magnetic cores were placed inside specially manufactured hardened steel casings composed of a bottom or base, and pointed top that screwed over the base.

A 25 shot core gun was loaded with minimally modified drivers (designed to release the bullet after penetration through the use of shear pins), release sleeve, and marker capsules fitted with either samarium cobalt or neodymium magnets and then lowered into a test well. 23 shots were attempted at various depths using charges of 2.7 to 6.0 grams, of those:

8 marker capsules were successfully placed
8 marker capsules were left in the well
6 marker capsules were stuck in the assembly and thus returned to surface
1 misfire None of the 2.7 gram charges penetrated deeply enough to remain in the formation during the logging runs. The marker capsules that returned to surface with the drivers had their shear pins broken, but the capsules were wedged into the release sleeve. A large contributing factor was mud and rock being forced into this area causing them to become stuck. Though they had been placed into the formation it was fairly east to pull them out. For those missing in the hole, the cause has not yet been determined.

Figure 6:
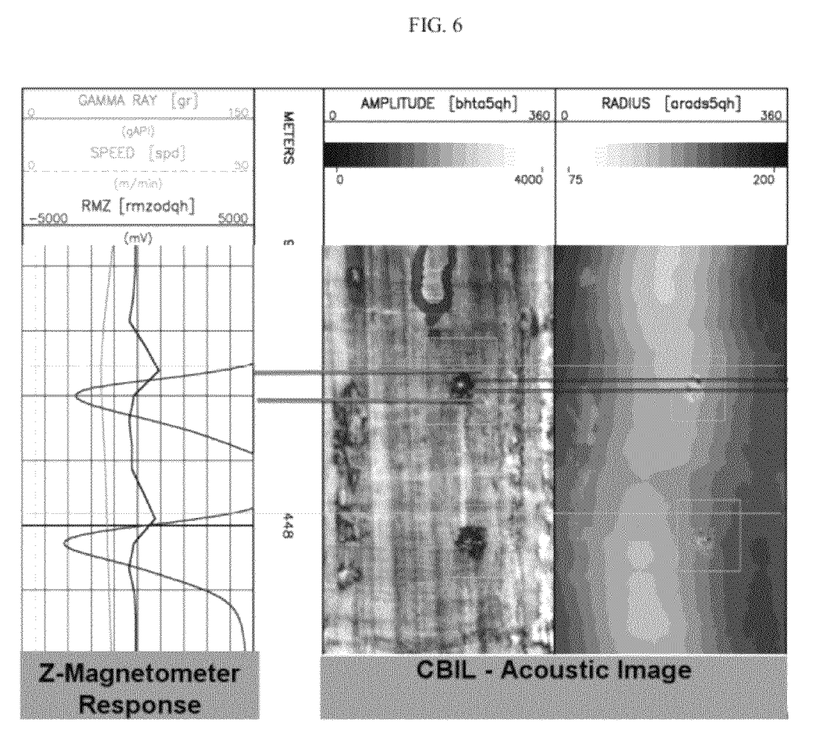
FIG. 6 shows the magnetic signal (left) and the acoustic image, obtained use a magnetometer and an acoustic imaging log, respectively. The magnetometer response in the Z direction clearly indicates the position of the magnet derived from the peak response, while the imaging tool illustrates the magnets penetration location and the formation damage around the shot-hole. The imaging log using an acoustic pulse and measures the reflected energy to image the borehole and effectively measure an offset distance.
Figure 7:
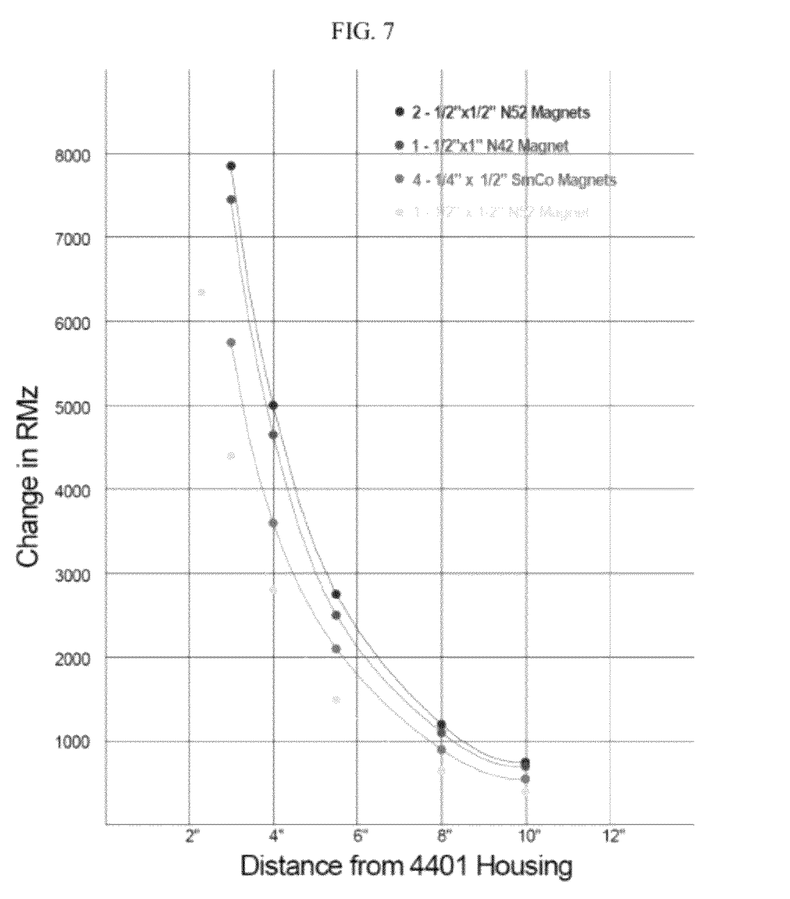
FIG. 7 shows the detection of magnetic markers as a function of distance as measured in a laboratory. The markers contain magnetic cores of 2 0.5×0.5 inch N52—commercially available neodynium (NdFeB) magnets, 1 1×0.5 inch N42 magnet, 4 0.25×0.5 inch stacked SmCo magnets, and 1 0.5×0.5 inch N52 magnet. For those markers placed at 1" the signal was saturated, but markers places 8 inches from the well bore were harder to detect. The targeted offset distance of the magnet and the strength should be optimized in unison to obtain an ideal signal for time-lapse measurements.

Of those markers placed in the formation, they were not placed very deep, anywhere from 0" to 1.2" inches only. Markers were easily detected using a magnetometer, see FIG. 6 (left), and placement could be assessed using an acoustic imaging log.

The overall design concept in principle appears to be functional, except that the release mechanism can be modified to improve the placing of magnetic markers into the formation and protect the device from being jammed with mud. Charge can be increased incrementally to place the markers a fixed distanced into the formation, as based on formation and marker characteristics. Alternatively, the markers can be placed using a sidewall drilling tool such as the MAX-PERF™, made by PENETRATORS CANADA INC.

It is explicitly recognized that any of the elements and features of each of the devices described herein are capable of use with any of the other devices described herein with no limitation. Furthermore, it is explicitly recognized that the steps of the methods herein may be performed in any order except unless explicitly stated otherwise or inherently required otherwise by the particular method.

Each and every claim is incorporated into the specification as an embodiment of the present invention. Thus, the claims are part of the description and are a further description and are in addition to the preferred embodiments of the present invention. The discussion of any reference is not an admission that it is prior art to the present invention, especially any reference that may have a publication date after the priority date of this application.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations and equivalents are considered within the scope and spirit of the present invention. Also, the terms in the claims have their plain, ordinary meaning unless otherwise explicitly and clearly defined by the patentee.

What is claimed is:

1. A method for measuring deformation in a subterranean formation comprising the steps of:
   introducing a plurality of magnetic markers into a well hole of a subterranean formation at different depths, such that each of the plurality of magnetic markers are equally spaced-apart from one another in depth;
   introducing a logging tool into said well hole, wherein the logging tool comprises an elongated body and at least two magnetic sensors therein spaced apart at about the same spacing as the magnetic markers;
   determining a first spatial position of each magnetic marker;
   re-introducing the logging tool into the well bore after an elapse of time; and
   determining a second spatial position of each magnetic marker, and thereby measuring the deformation in the subterranean formation.

2. The method of claim 1, wherein the logging tool also determines inclination and declination of the plurality of magnetic markers.

3. The method of claim 2, wherein each of the at least two magnetic sensors comprises three orthogonal vector magnetometers.

4. The method of claim 1, wherein each of at least two magnetic sensors comprises a scalar magnetometer.

5. The method of claim 3, wherein the magnetic sensors further comprise a pair of scalar magnetometers.

6. The method of claim 1, wherein the magnetic marker comprises a magnetic core and an outer casing.

7. The method of claim 1, wherein the magnetic marker comprises a magnet selected from the group consisting of a rare earth magnet, a neodymium magnet, a samarium-cobalt magnet, a $Sm(Co,Fe,Cu,Zr)_7$ magnet, a $YCo_5$ magnet, a battery powered magnet, an RF powered magnet, an alnico magnet, a bonded magnet, a ceramic (ferrite) magnet, and a flexible rubber magnet.

8. The method of claim 1, wherein the magnetic marker comprises a rare earth magnet.

9. The method of claim 8, wherein the rare earth magnet generates a magnetic field of at least 1.4 Tesla.

10. A system for determining the amount of deformation in a subterranean formation, said system comprising the following components:

(a) a logging tool having elongated body and at least two magnetic sensors therein spaced apart therein by a first distance; and (b) a plurality of magnetic bullets, said bullets comprising a magnetic core surrounded by an external casing having a point and an end; and (c) means for calculating deformation based on measurements over time provided by said logging tool of the positions and optionally orientation of said magnetic bullets when placed in a subterranean formation at different depths therein, said different depths separated by about said first distance.

11. The system of claim 10, further comprising a perforation gun for inserting said plurality of magnetic bullets into said subterranean formation.

12. The system of claim 10, further comprising a sidewall drilling tool for inserting said plurality of magnetic bullets into said subterranean formation.

13. The system of claim 10, wherein the magnetic core comprises a rare earth magnet.

14. The system of claim 10, wherein the rare earth magnet generates a magnetic field of at least 1.4 Tesla.

15. The system of claim 10, wherein the magnetic core comprises $YCo_5$, neodymium, samarium-cobalt or combinations thereof.

16. The system of claim 10, wherein said at least two magnetic sensors each comprise a vector magnetometer.

17. The system of claim 10, wherein said at least two magnetic sensors each comprises three orthogonal vector magnetometers.

18. The system of claim 10, wherein said magnetic sensors comprise a pair of vector magnetometers and a pair of scalar magnetometers.

19. The system of claim 10, wherein said magnetic sensors comprise a pair of three orthogonal vector magnetometers and a pair of scalar magnetometers.

* * * * *